US00RE40273E

(19) United States
(12) Reissued Patent
Grace, Jr. et al.

(10) Patent Number: US RE40,273 E
(45) Date of Reissued Patent: Apr. 29, 2008

(54) METHOD OF MANUFACTURING AN ARCHERY BROADHEAD WITH SINTERED COMPONENTS

(75) Inventors: Louis Grace, Jr., North Street, MI (US); Nathaniel E. Grace, Port Huron, MI (US)

(73) Assignee: G5 Outdoors, L.L.C., Memphis, MI (US)

(21) Appl. No.: 11/078,917
(22) Filed: Mar. 14, 2005

Related U.S. Patent Documents

Reissue of:
(64) Patent No.: 6,749,801
Issued: Jun. 15, 2004
Appl. No.: 10/360,690
Filed: Feb. 7, 2003

U.S. Applications:
(60) Division of application No. 09/910,385, filed on Jul. 20, 2001, now Pat. No. 6,595,881, which is a continuation-in-part of application No. 09/546,146, filed on Apr. 10, 2000, now Pat. No. 6,290,903.
(60) Provisional application No. 60/219,474, filed on Jul. 20, 2000.

(51) Int. Cl.
*B22F 3/10* (2006.01)

(52) U.S. Cl. ..... 419/36; 419/38; 473/583; 473/584

(58) Field of Classification Search ..... 419/36, 419/38; 473/583, 584
See application file for complete search history.

(56) References Cited

U.S. PATENT DOCUMENTS

| | | | | | |
|---|---|---|---|---|---|
| 3,915,455 | A | * | 10/1975 | Savora | 473/584 |
| 4,093,230 | A | * | 6/1978 | Simo | 473/583 |
| 4,099,720 | A | * | 7/1978 | Zeren | 473/584 |
| 4,166,619 | A | * | 9/1979 | Bergmann et al. | 473/581 |
| 4,212,464 | A | * | 7/1980 | Pelouch | 473/578 |
| 4,452,460 | A | * | 6/1984 | Adams | 473/584 |
| 4,932,671 | A | * | 6/1990 | Anderson, Jr. | 473/583 |
| 4,986,550 | A | * | 1/1991 | Segovia | 473/584 |
| 5,078,407 | A | * | 1/1992 | Carlston et al. | 473/583 |
| 5,145,186 | A | * | 9/1992 | Maleski | 473/584 |
| 5,165,697 | A | * | 11/1992 | Lauriski et al. | 473/584 |
| 5,203,573 | A | * | 4/1993 | Brailean | 473/584 |
| 5,380,179 | A | * | 1/1995 | Nishimura et al. | 419/36 |
| 5,482,293 | A | * | 1/1996 | Lekavich | 473/584 |
| 5,584,845 | A | * | 12/1996 | Hart | 606/174 |
| 5,820,498 | A | * | 10/1998 | Maleski | 473/584 |
| D406,305 | S | * | 3/1999 | Runde | D22/115 |
| 5,931,751 | A | * | 8/1999 | Cooper | 473/583 |
| 6,217,467 | B1 | * | 4/2001 | Maleski | 473/583 |
| 6,290,903 | B1 | * | 9/2001 | Grace et al. | 419/28 |
| 6,322,464 | B1 | * | 11/2001 | Sestak | 473/583 |
| 6,595,881 | B1 | * | 7/2003 | Grace et al. | 473/583 |
| 2002/0128096 | A1 | * | 9/2002 | Muller | 473/583 |
| 2003/0022741 | A1 | * | 1/2003 | Muller | 473/583 |

OTHER PUBLICATIONS

"An Introduction to Injection Molding Metals & Ceramics", Jun. 1999, pp. 4–5.*
"Bowhunting Equipment", 1999 Buyers Guide, p. 70.*
Web site Cabela's—http://www.cabelas.com, "BoneBuster Broadheads".*

* cited by examiner

*Primary Examiner*—George Wyszomierski
(74) *Attorney, Agent, or Firm*—Warner Norcross & Judd LLP

(57) ABSTRACT

The present invention relates generally to a method of manufacturing broadhead components utilizing a powder injection molding (PIM) process that reduces the number of operations, thus simplifying the manufacturing process required to produce a finished product while maintaining the precision essential to the function of this commodity. The method of manufacturing includes powder injection molding one or more than one components for a broadhead, sintering the component(s) at an elevated temperature to form component(s) and assembling the component(s) to form a broadhead.

12 Claims, 9 Drawing Sheets

FIG 10
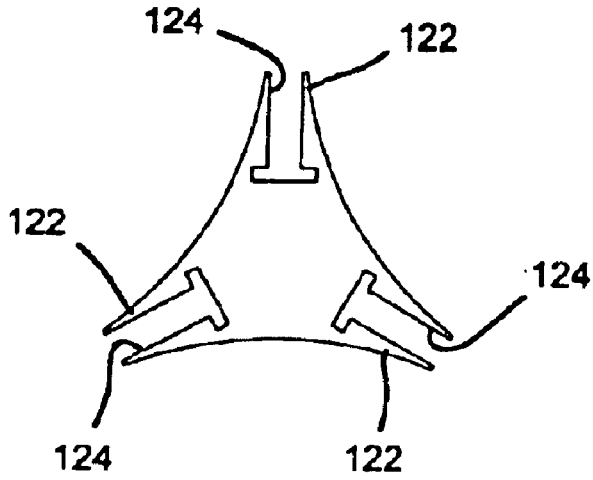
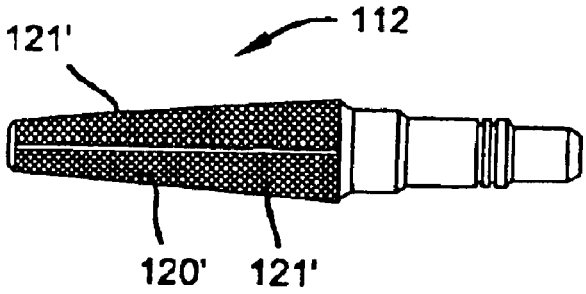
FIG 11
FIG 12
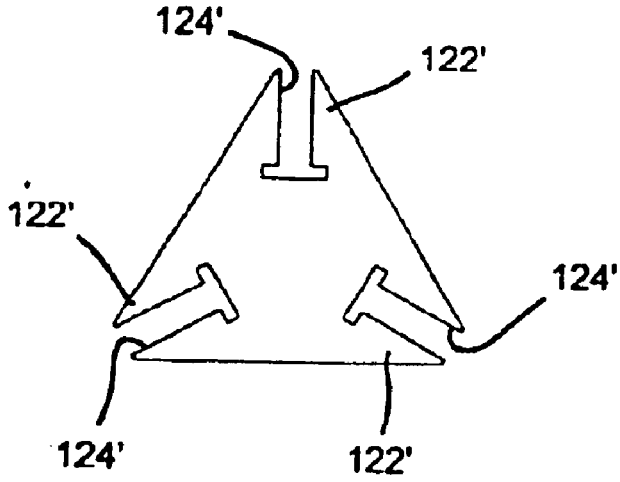

METHOD OF MANUFACTURING AN ARCHERY BROADHEAD WITH SINTERED COMPONENTS

Matter enclosed in heavy brackets [ ] appears in the original patent but forms no part of this reissue specification; matter printed in italics indicates the additions made by reissue.

CROSS-REFERENCE TO RELATED APPLICATION

This application is a divisional of prior application Ser. No. 09/910,385 entitled "Broadhead and Method of Manufacture" filed on Jul. 20, 2001 now U.S. Pat. No. 6,595,881, which is a continuation in part of prior application Ser. No. 09/546,146 entitled "Broadhead and Method of Manufacture" filed on Apr. 10, 2000 now U.S. Pat. No. 6,290,903 and which also claims priority under 35 U.S.C. §119(e) to U.S. Provisional Patent Application No. 60/219,474 filed on Jul. 20, 2000 and entitled Expanding Archery Broadhead, the specification and drawings of which are hereby expressly incorporated by reference.

BACKGROUND OF THE INVENTION

The present invention relates generally to an archery arrow and more specifically to the design and method of manufacture of the broadhead for an archery arrow.

The components of a typical archery broadhead include a ferrule or body having one or more blades extending therefrom. Additionally, the tip of the broadhead may be a separate component secured to the front of the ferrule. Two types of archery broadheads are generally known in the industry as fixed or replaceable blade broadheads and moveable or mechanical blade broadheads. The moveable blade broadheads, by design, are in a closed position in flight and open upon impact with the target.

Conventionally, the components of archery broadheads are manufactured using a variety of processes. The ferrule is conventionally turned or stamped with a male thread at the end where it attaches to an arrow shaft. Where the tip is not formed [is] *as* an integral of the ferrule, an internal or female thread is formed on the front of the ferrule for receiving and securing the broadhead tip. Additional machining operations are necessary to provide the slots or other openings in the ferrule essential to the attachment of the blades. The blades are generally stamped steel with a uniform cross-section that requires subsequent grinding and honing operations to provide the sharpened edges. Thus, removable blades [adds] *add* to the complexity of [manufacturer] *manufacturing*, as does the use of irregular skin surface treatments on the ferrule. Tapered blades instead of stamped blades add strength and resistance to bending.

Broadhead components manufactured using conventional processes require a variety of costly equipment to achieve and maintain the precision essential to proper functioning of this commodity. Accordingly, there is a need to provide an efficient method of manufacturing [from] *of* many of the broadhead components to reduce the cost, add design flexibility and still maintain the precision required.

SUMMARY OF THE INVENTION

It is an object of the present invention to provide a method of manufacturing broadhead components utilizing a process that reduces the number of operations, and thus simplifies the process[,] required to produce a finished product while maintaining the precision essential to the function of this commodity.

It is an additional object of the present invention to provide different materials as dictated by the particular application, in the manufacture of broadhead components utilizing the aforementioned process.

It is another object of the present invention to provide a monolithic ferrule, manufactured utilizing a powder injection molding (PIM) process incorporating integral design features necessary for the proper assembly and functioning of the broadhead.

It is a further object of the present invention to provide broadhead blades, manufactured by the PIM process, with tapered or otherwise varying cross sections so as to enhance the strength [in] *and* aerodynamic qualities of the broadhead.

It is yet another object of the present invention to provide blades, manufactured by the PIM process, having scalloped, serrated or otherwise varying cutting edge treatments so as to enhance the cutting and penetration abilities of the broadhead.

It is an additional object of the present invention to provide a broadhead point, manufactured by the PIM process which may be used interchangeably with a variety of ferrules.

It is still another object of the present invention to provide a ferrule and broadhead point, either separately or integral with the ferrule, manufactured by the PIM process having a surface texture so as to enhance the aerodynamic and penetration qualities of the broadhead.

In accordance with a first preferred embodiment of the present invention, an expanding-blade broadhead is provided including a ferrule having an integral boss formed thereon, a plurality of cutting blades supported on the boss and pivotally coupled to the ferrule and a collar for retaining the blades on the boss while permitting free rotation thereof. A threaded shank portion is formed on the end of the ferrule opposite the point for securing the broadhead to the arrow shaft in a conventional manner. The use of powdered metallurgy and subsequent sintering processes provides a preferred, but not essential method of manufacturing the ferrule and retaining collar.

In accordance with a second preferred embodiment of the present invention, a fixed blade broadhead is provided including a ferrule having a blade receiving slot formed therein, a broadhead tip threadedly secured to the ferrule and a plurality of cutting blades disposed in the slots formed in the ferrule and releasably secured thereto by the broadhead tip. A threaded shank portion is formed on the end of the ferrule opposite the point for securing the broadhead to an arrow shaft in a conventional manner. The use of powdered metallurgy and subsequent sintering processes provides a preferred, but not essential method of manufacturing the ferrule, blades and broadhead tip.

These and other objects, features and advantages of the present invention will become apparent from the following description when viewed in accordance with the accompanying drawings and appended claims.

BRIEF DESCRIPTION OF THE DRAWINGS

FIG. 10 is a cross-sectional view taken through the ferrule portion of the broadhead illustrated in FIG. 9;

FIG. 11 is an alternate embodiment of a ferrule for the fixed-blade broadhead having a surface texture treatment;

FIG. 12 is a cross-sectional view taken through the ferrule portion of the broadhead illustrated in FIG. 11;

DETAILED DESCRIPTION OF THE PREFERRED EMBODIMENTS

With reference now to the FIGS. 1–8, a first preferred embodiment of the present invention is illustrated in the form of an expandable-blade broadhead. Broadhead 10 includes ferrule 12, cutting blades 14 pivotally coupled to ferrule 12 and collar 16 disposed over an end of ferrule 12 for retaining cutting blades 14 thereon.

Figure 1:
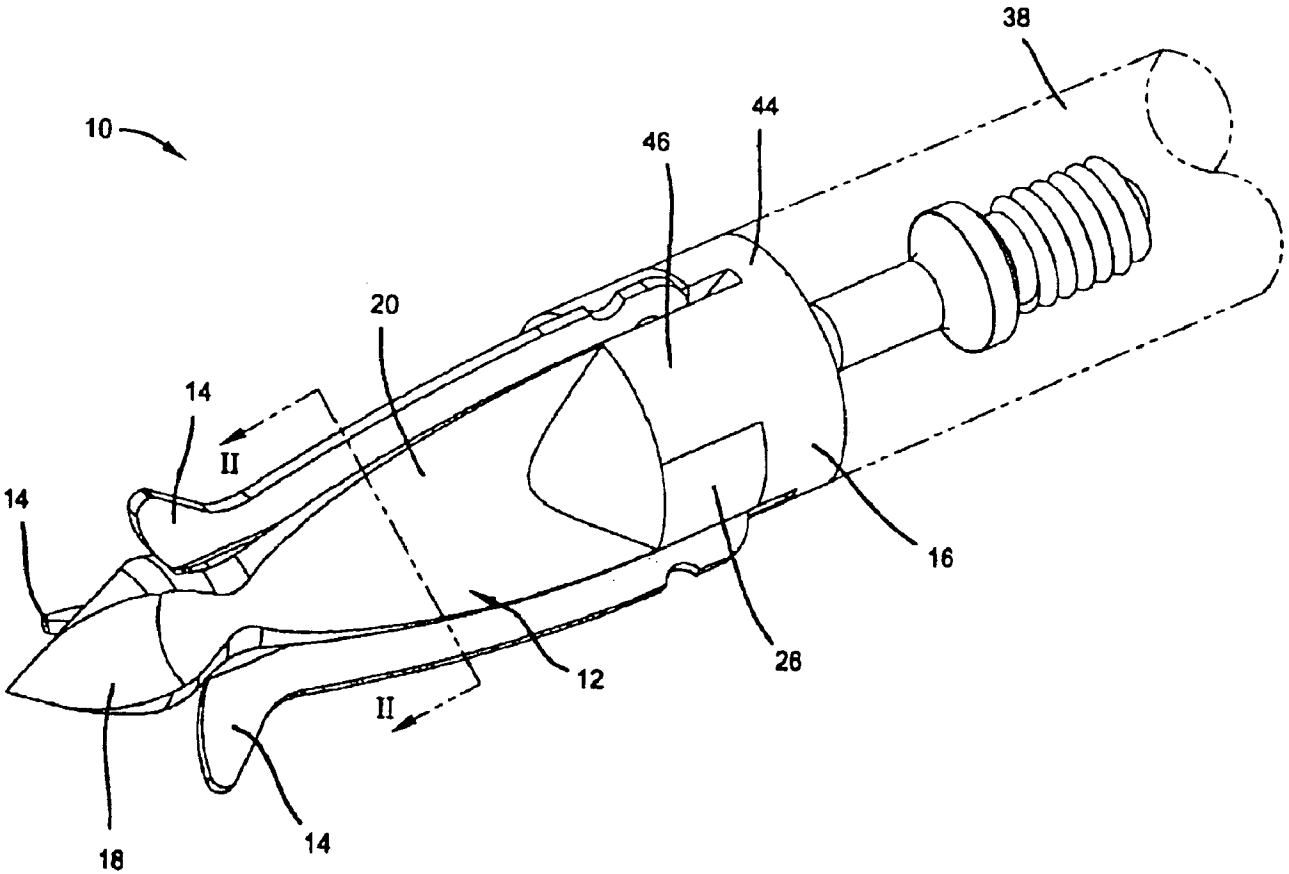
FIG. 1 is a perspective view of an expanding-blade broadhead in accordance with the present invention in which the blades are in a retracted position and with an arrow shaft illustrated in phantom lines.
Figure 2:
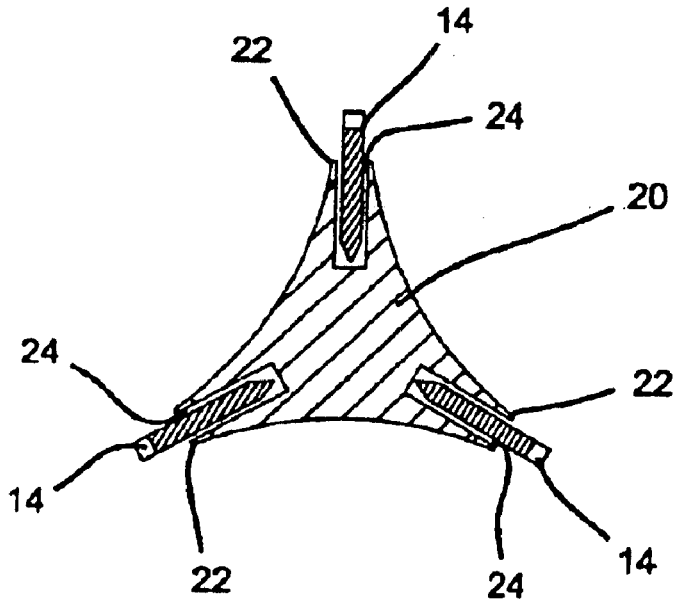
FIG. 2 is a cross-section taken through lines II—II shown in FIG. 1.
Figure 3:
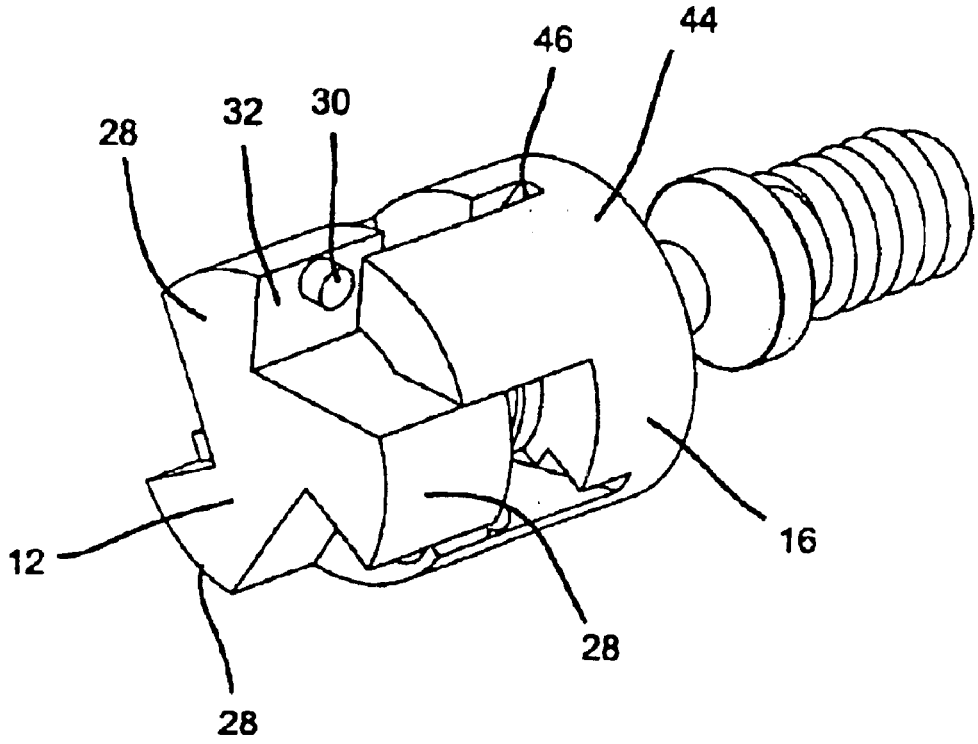
FIG. 3 is a detailed perspective view illustrating the ferrule and retaining collar of the present invention.
Figure 4:
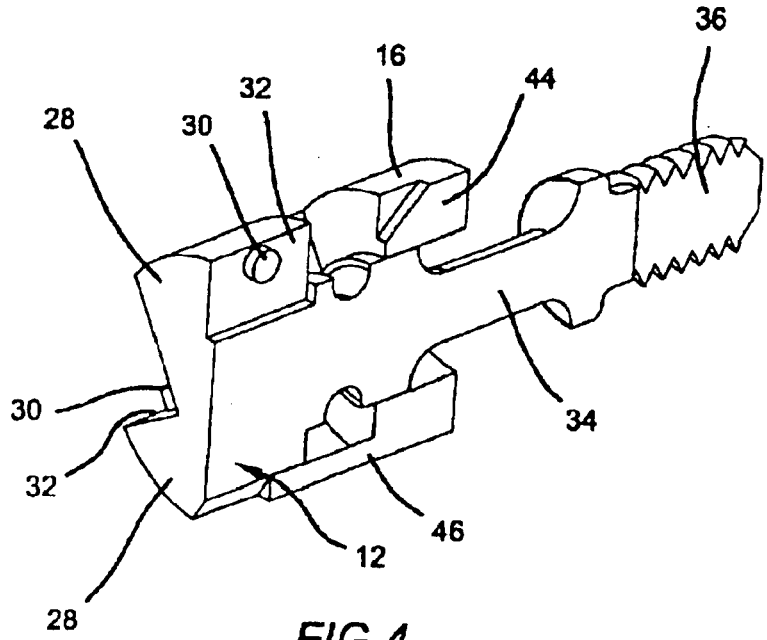
FIG. 4 is a cross-sectional view of a portion of the ferrule and the retaining collar shown in FIG. 3.

A substantially conical or trocar shaped tip 18 is formed at a forward end of ferrule 12. The body 20 of ferrule 12 is generally conical or trocar shaped having a triangular cross-section as best seen in FIG. 2. Each of the vertices 22 of body 20 has a slot 24 formed therein which receives cutting blade 14 when in the retracted position. Ferrule 12 further has a base portion 26 having three lugs 28 extending radially from the ferrule. A boss 30 extends from the radial face 32 of lug 28. Shank 34 extends rearwardly from base portion 26 and has a male threaded portion *36* formed at the end thereof for operably coupling broadhead 12 to arrow shaft 38.

Figure 6:
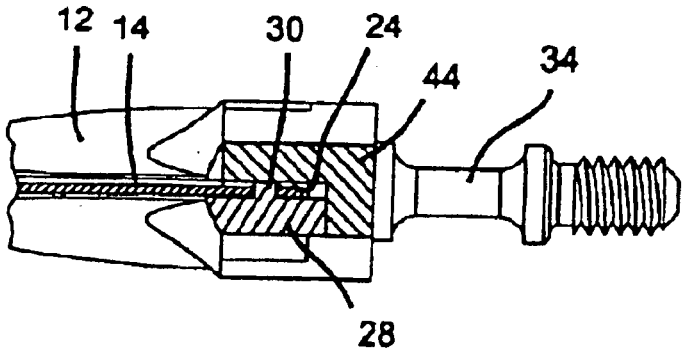
FIG. 6 is a partial cross-section illustrating the pivotal connections between the ferrule and the cutting blade.
Figure 7:
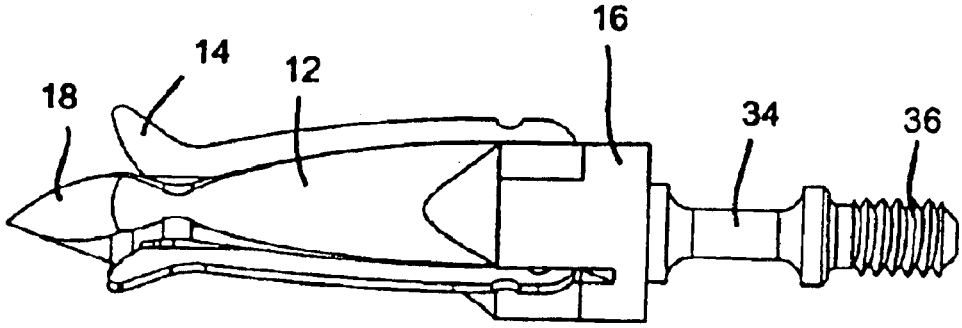
FIG. 7 is a side view of the expanding-blade broadhead shown in a retracted position.
Figure 8:
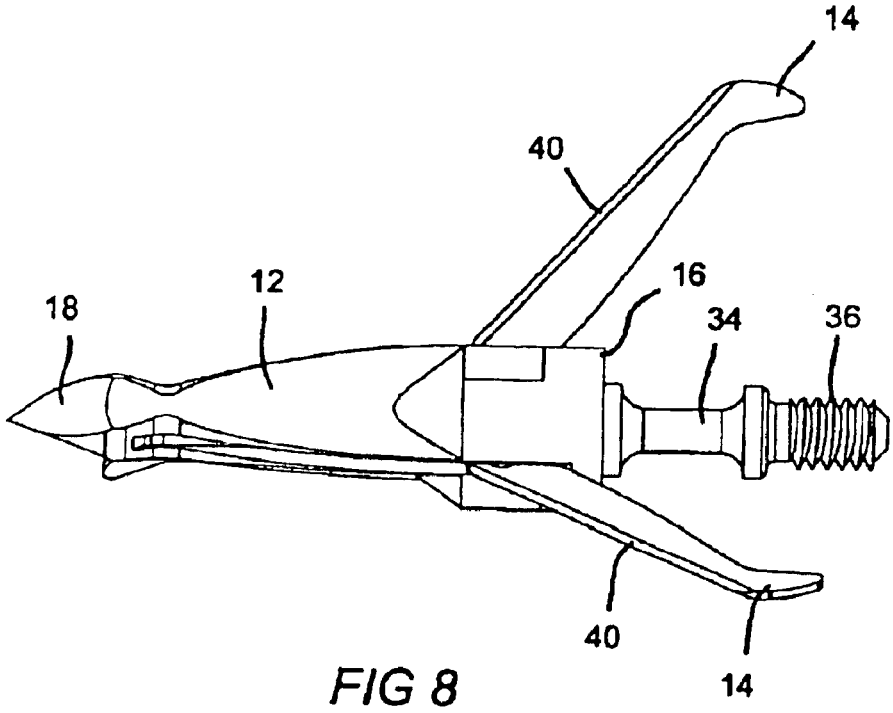
FIG. 8 is a side view of the expanding-blade broadhead shown in the deployed position.
Figure 9:
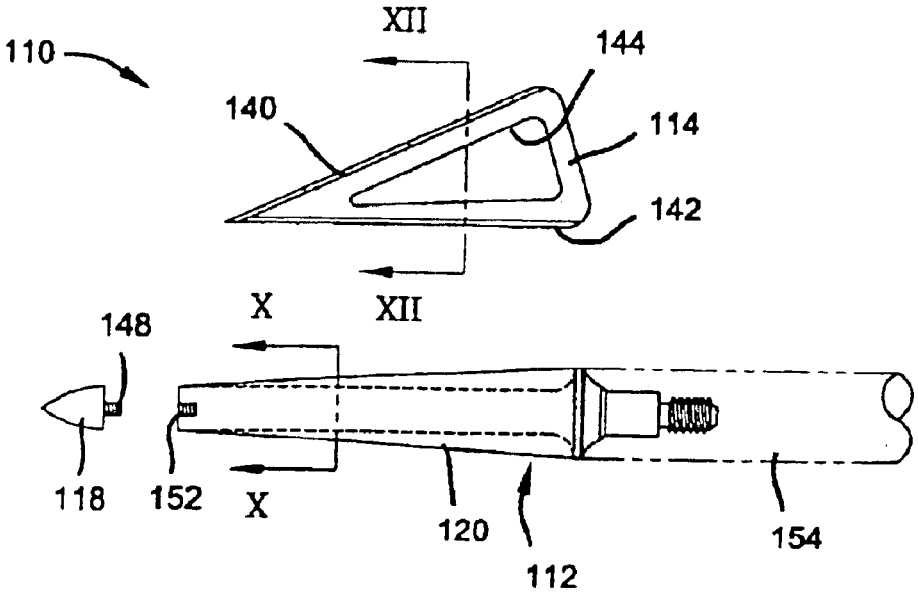
FIG. 9 is an exploded side view of a fixed-blade broadhead in accordance with the present invention with an arrow shaft illustrated in phantom lines.

Cutting blades 14 have a cutting edge 40 formed thereon. Aperture 42 is formed in a bottom portion of cutting blade 14 and is adapted to [received] *receive* boss 30 for pivotally coupling cutting blade 14 to ferrule 12. Collar 16 is slidably received over shank 34 and has an annular skirt portion 44 with fingers 46 extending longitudinally forward such that fingers 46 are positioned adjacent to lugs 28 formed on ferrule 12. A radial face 48 defined by fingers 46 is generally parallel to but spaced apart from radial face 32 to further define slot 24. As best seen in FIG. 6 a slight clearance is provided between the end of boss 30 and the radial face 48 of finger 46 such that collar 16 may be readily positioned onto ferrule 12, while at the same time sufficiently retaining cutting blade 14 onto boss 30.

Figure 5:
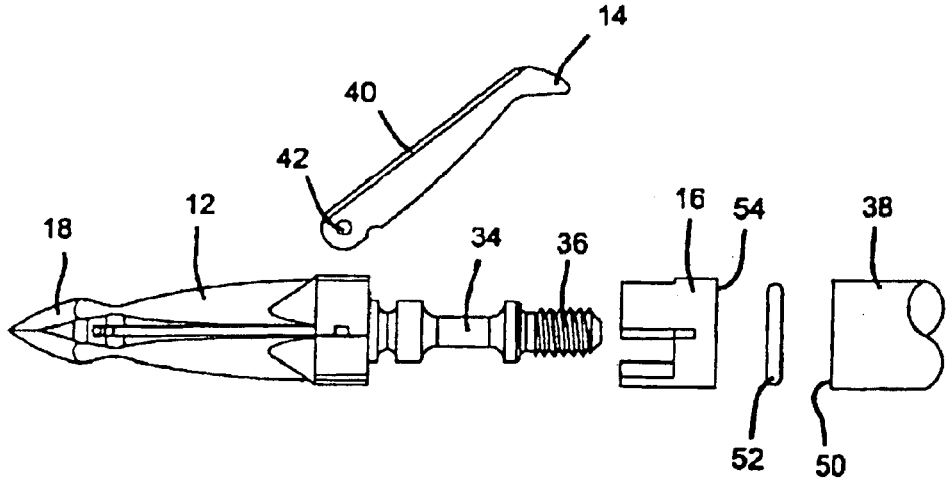
FIG. 5 is an exploded side view illustrating the components of the expanding-blade broadhead of the present invention.

As best seen in FIG. 5, broadhead 10 is threadedly secured to arrow shaft 38 such that the forward face 50 of arrow shaft 38 pushes retaining collar 16 onto ferrule 12. As presently preferred, a compliant element 52 is interdisposed between rearward face 54 formed on retaining collar 16 and forward face 50 of arrow shaft 38 to prevent loosening therebetween.

While various design features have been described above, one skilled in the art will readily recognize that certain modifications, variations and changes may be made without departing from the scope of the invention. In this regard the overall shape and geometric configuration of the ferrule may be adapted to various shapes. In addition, the expanding broadhead may incorporate more or less cutting blades as the particular application requires. The retaining collar may be secured to the ferrule by other suitable manners. The shaft of the ferrule may be formed of a separate piece from the body of the ferrule.

As previously indicated, some of the components of broadhead 10, and in particular ferrule 12 and retaining collar 16 may be manufactured using a powdered metallurgical manufacturing process resulting in monolithic components. The powdered metallurgical process permits net shape or near net shape parts which have intricate design features. Furthermore, the powdered metallurgical process provides greater control over the shape and weight of the broadhead, and also improves the overall strength of the broadhead. The powdered metallurgical process also eliminates many fabricating and machining steps associated with conventional broadhead manufacturing.

With references now to FIGS. 9–14, a second preferred embodiment of the present invention is illustrated in the form of a fixed-blade broadhead. Broadhead 110 includes ferrule 112, *and* cutting blades 114 releasably secured to ferrule 112. A conical or trocar shaped tip 118 is threadedly secured at a forward end of ferrule 112 and functions to releasably secure cutting blades 114 thereon. The body 120 of ferrule 112 is generally conically shaped having a triangular cross-section as best seen in FIG. 10 and has a shank 134 extending rearwardly therefrom. Each of the vertices 122 of body 120 has a T-shaped *slot* 124 formed therein which releasably secures cutting blades 114 to ferrule 112.

Figure 13:
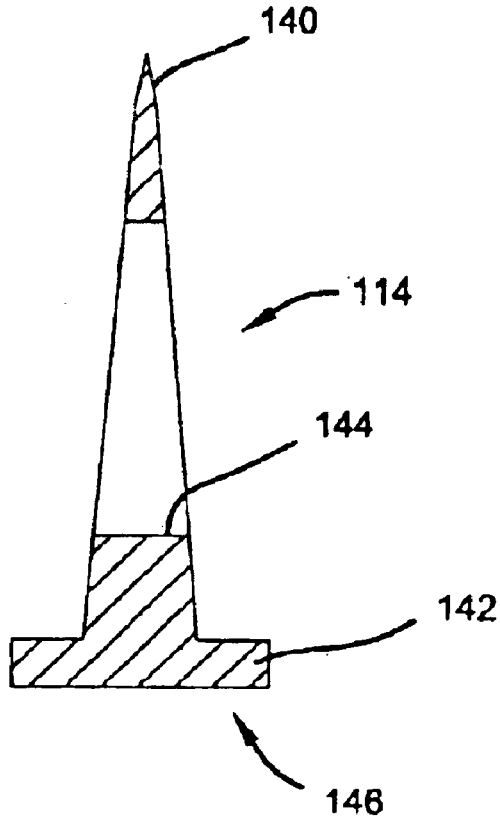
FIG. 13 is a detailed cross-section view taken through the blade portion of the broadhead illustrated in FIG. 9 showing tapered blade possibilities.

Cutting blades 114 have a cutting edge 140 formed along the distal edge thereof. As best seen in FIG. 13, a bead 142 having a profile which compliments T-shaped slot 124 is formed along the proximal edge of cutting blade 114. A generally triangular aperture 144 is formed in the body of cutting blade 114 to reduce the overall weight of the broadhead and distribute the mass of the blade around its perimeter. As presently preferred, cutting blade 114 has a tapering cross-section from the proximal edge 146 to the distal cutting edge 140.

Slot 124 is configured to receive the proximal edge 146 of cutting blade 114 including bead 142. Cutting blade 114 is slid axially into slots 124 formed in ferrule 112. A threaded shank 148 is formed on the back surface of broad tip point 118 and is received in a threaded aperture 152 formed in ferrule 112. In this way, broadhead tip 118 retains and secures cutting blades 114 with ferrule 112. While a T-shaped slot configuration and complimentary bead profile is presently preferred, one skilled in the art will recognize that other slot configurations and bead profiles (such as L-shaped, circular, square, etc.) which cooperate to releasably secure blades 114 to ferrule 112 are contemplated by the present invention.

Broadhead 110 may be threadedly secured to arrow shaft 154 in the manner heretofore described. A compliant element (not shown) may be interdisposed between ferrule 112 and arrow shaft 154 to prevent loosening therebetween. As presently preferred, blades 114 are releasably secured to ferrule 112 by tip 118. However, one skilled in the art will recognize that ferrule 112 could be configured such that a retaining element disposed over shank 134 or arrow shaft 154 functions to releasably secure blades 114 to ferrule 112.

With reference now to FIG. 11, an alternate embodiment of the ferrule is illustrated. The body 120' of ferrule 112' is generally pyramidally shaped having a triangular cross-section as best seen in FIG. 12. Each of the vertices 122' of body 120' has a slot 124' formed therein which receives cutting blades 114. The planar surfaces 121' of body 120' have a generally textured surface formed thereon for enhancing aerodynamic and penetration properties of the broadhead. In this regard, U.S. Pat. No. 5,871,410, the disclosure of which is expressly incorporated by reference herein, discloses a broadhead in which the ferrule has such a textured surface.

Figure 14:
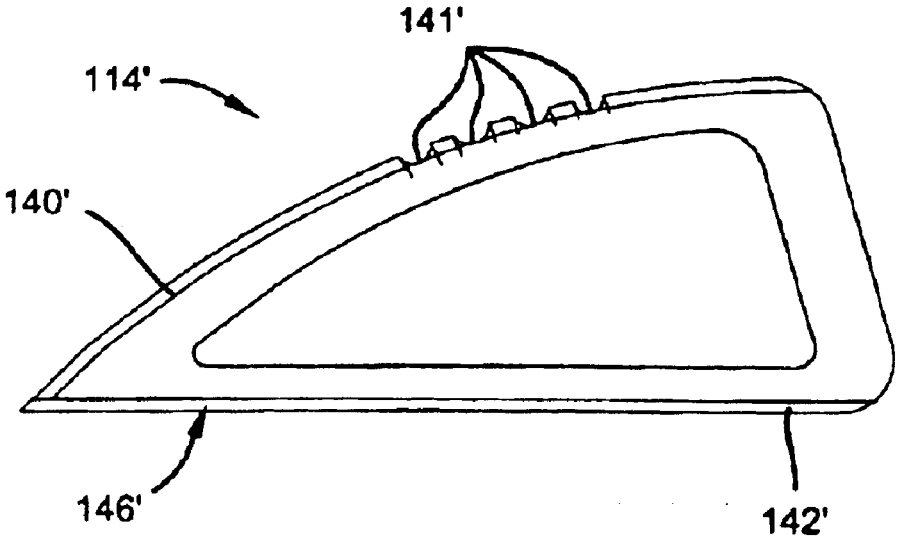
FIG. 14 is an alternate embodiment of the blade for the fixed blade broadhead assembly illustrated in FIG. 9.

With reference now to FIG. 14, an alternate embodiment of the cutting blades utilized in the present invention is illustrated. Specifically, cutting blade 114' is generally triangularly configured having a cutting edge 140' formed on a distal edge thereof. In addition, a plurality of scallops or serrations 141' are formed in the cutting edge to further facilitate cutting of the broadhead upon impact. Cutting blade 114' further includes a bead disposed along a proximal edge thereof for releasably securing blade 114' within ferrule 112 in a manner hereto for described.

Figure 15:
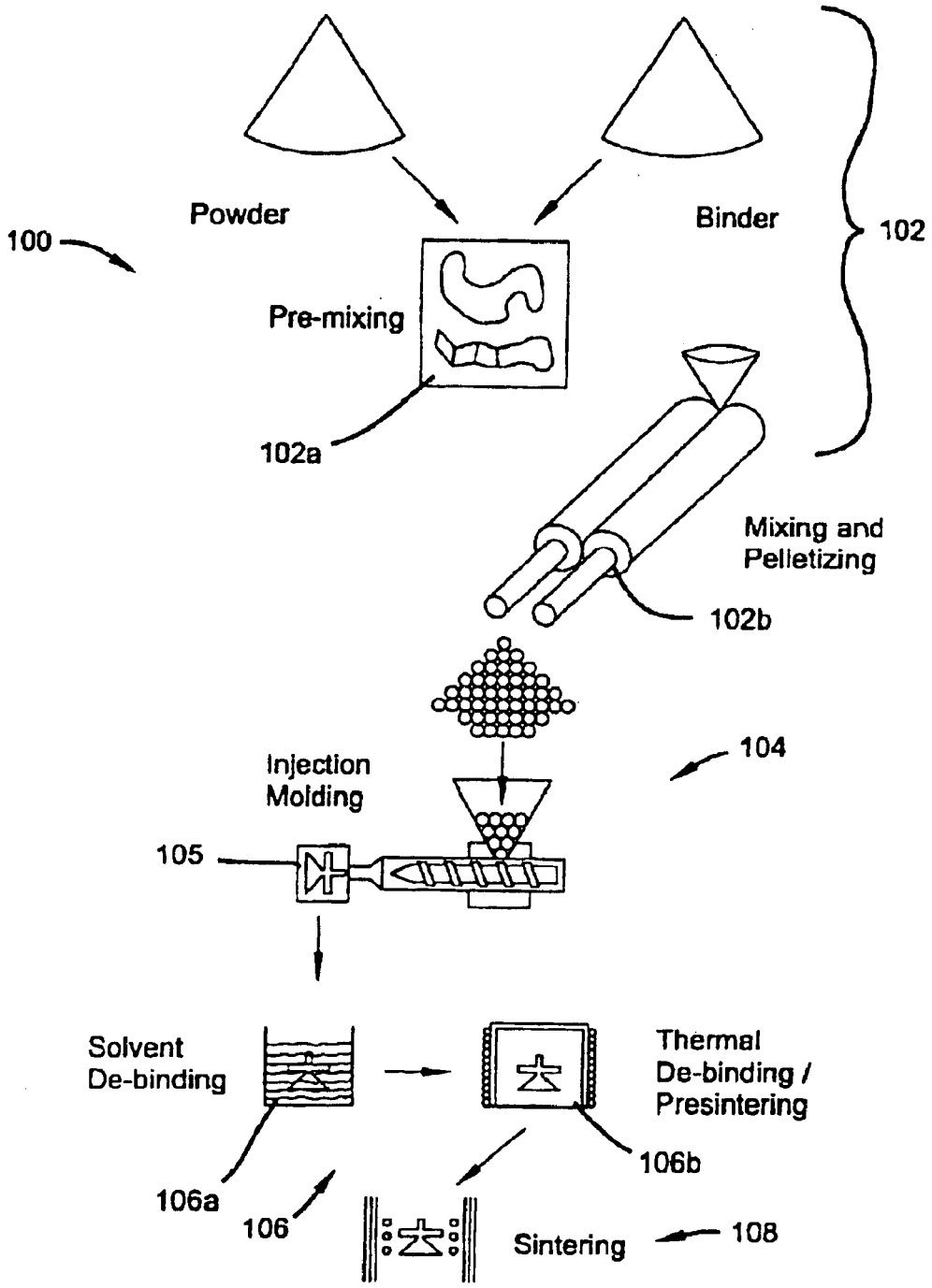
FIG. 15 is a schematic diagram generally illustrating the method of manufacturing components of the broadhead in accordance with the present invention using powdered metallurgy technology.
Figure 16:
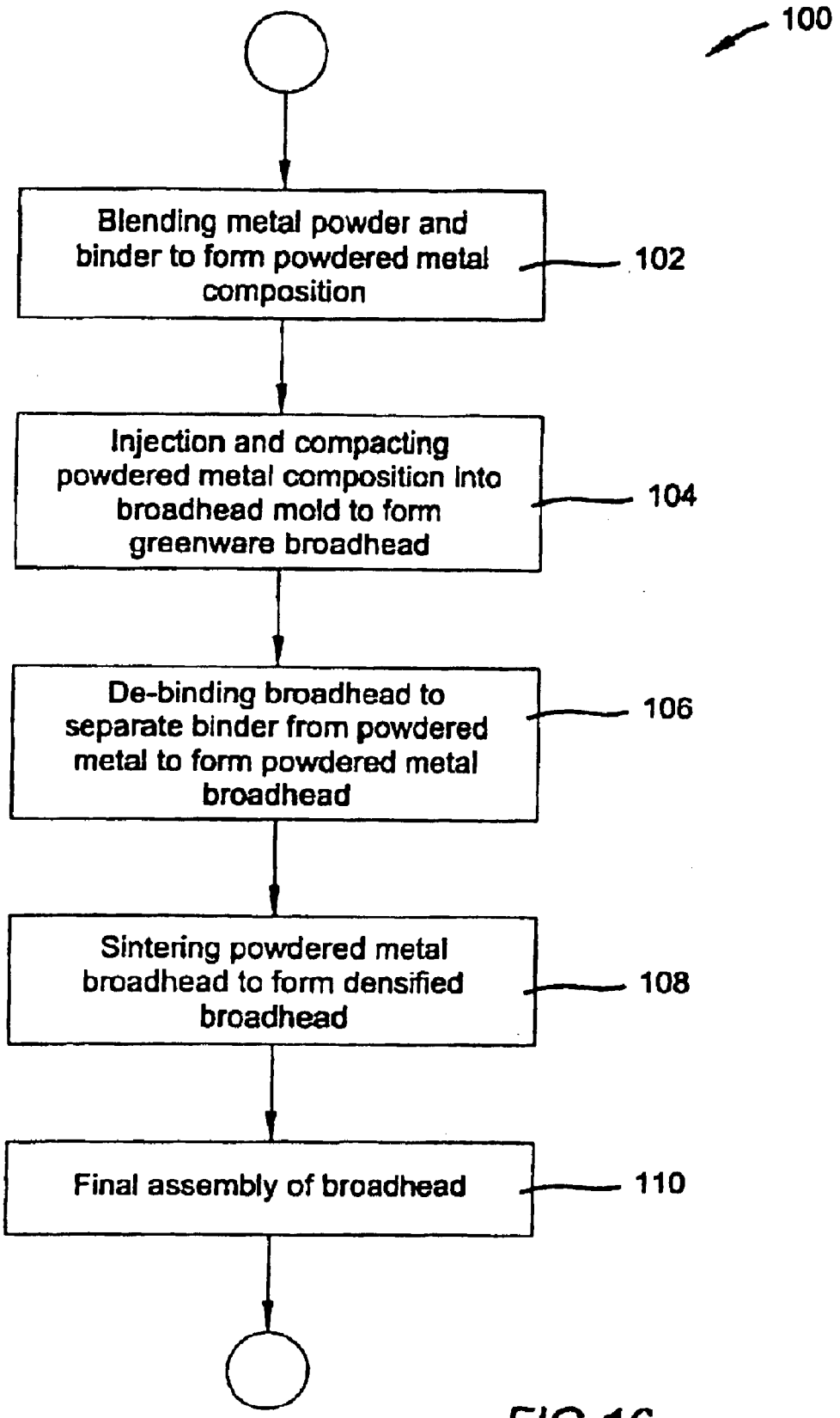
FIG. 16 is a flow chart illustrating the method of manufacturing the components of the broadhead in accordance with the present invention using powdered metallurgy technology.

With reference now to FIGS. 15 and 16, a general description of a preferred method of manufacturing a broadhead in accordance with the present invention will now be described. A more detailed description is set forth in U.S. application Ser. No. 09/546,146 filed on Apr. 10, 2000 and entitled "Broadhead and Method Of Manufacture", the disclosure of which is expressly incorporated by reference herein. The method of manufacture is schematically illustrated in flow chart 100.

The manufacturing process is initiated by blending metal powder and binder to form a powdered metal composition as represented at block 102. When blending, the metal powder and binder are typically premixed in a first blending step 102a and then fully mixed to a near homogenous mixture and pelletized in a second blending step 102b. In this regard, a particular metal such as high carbon steel or titanium is mixed with a suitable binder such as a plastic or wax to form a powdered metal composition. Alternatively, plastic, ceramic or composite materials suitable for powder injection molding (PIM) may be substituted for the powdered metal composition described above. Next, as represented in block 104, the powdered metal composition is injected into a broadhead mold 105 having the particular design configurations for fabricating ferrule 12 and collar 16 illustrated in FIGS. 1–8, or alternately for fabricating ferrule 112, cutting blade 114 and/or tip 118. One skilled in the art will recognized that the various PIM components of broadhead 110 are formed separately. Through the use of pressure or other means, the powdered metal composition is compacted into a greenware broadband component having the precise geometric configuration of the final product (although approximately 20% larger than the end design to account for shrinkage during subsequent processing) and moderate densification (on the order of approximately 50 densification).

Next, as represented in block 106, the greenware broadhead component is processed to eliminate the binder from the metal without melting the constituent metal, thereby forming a powdered metal broadhead component. As presently preferred, the greenware broadhead component is immersed in a solvent to separate a portion of the binder from the powdered metal as illustrated in block 106a. The greenware broadhead component is removed from the solvent and placed in a thermal debinding furnace represented at block 106b where any remaining binder is burned off. The thermal debinding furnace may also be employed to perform a pre-sintering step. While the debinding steps is described as a combination of chemical and thermal processes, one skilled in the art will readily recognize that any process or combination of processes could be employed to debind the greenware broadhead. At this point, the powdered metal broadhead component is still in a moderate densification state.

As represented at block 108, the powdered metal broadhead component is next placed in a sintering furnace and sintered at an elevated temperature and pressure to achieve near full density thereof. The sintering processing parameters are defined such that the broadhead reaches a density of at least 97%. During the sintering process, the overall size of the broadhead shrinks approximately 20%. Once sintering is complete, the broadhead component has a net shape and does not require further machining. In addition, the various features including slots, bosses and threaded shanks are already formed in the ferrule. Lastly, as represented at block 110, cutting blades are secured to the ferrule in a final assembly process of the broadhead.

As presently preferred, the broadhead components of the present invention are fabricated using a powdered metal technology. However, one skilled in the art will readily recognize that other powdered materials such as ceramics or plastics may be suitable, and thus utilized herein. The determination of the exact materials are dictated by the requirements of a given application.

From the foregoing description, one skilled in the art will readily recognize that the present invention is directed to an archery broadhead design and a method of manufacturing same. While the present invention has been described with particular reference to preferred embodiments, one skilled in the art will recognize from the foregoing discussion and accompanying drawings and claims, that changes, modifications and variations can be made in the present invention without departing from the spirit and scope thereof as defined in the following claims.

What is claimed is:

1. A method of manufacturing an archery broadhead comprising:

powder injection molding [at least one broadhead component selected from the group consisting of a ferrule and a blade], *with a powdered metal composition, a ferrule including a body and defining a slot*;

sintering said [at least one broadhead component] *ferrule* at an elevated temperature to form a sintered [broadhead component] *ferrule, the slot being formed and bounded substantially by metal*; and connecting [said] *a* blade to said ferrule.

2. The method of manufacturing an archery broadhead of claim 1 wherein said blade is releasably secured to said ferrule with a retainer.

3. [The] *A* method of manufacturing an archery broadhead [of claim 1] *comprising:*

*powder injection molding at least one broadhead component selected from the group consisting of a ferrule and a blade;*

*sintering said at least one broadhead component at an elevated temperature to form a sintered broadhead component; and*

*connecting said blade to said ferrule,* wherein said blade is pivotally coupled to said ferrule [with a retainer] *so that the blade is expandable from a retracted position to a deployed position.*

4. The method of manufacturing an archery broadhead of claim 1 [further] comprising:

forming a greenware ferrule from a powdered composition;

sintering said greenware ferrule at an elevated temperature to form a sintered ferrule; and connecting said blade to said sintered ferrule with [said] *a* retainer.

5. The method of manufacturing an archery broadhead of claim 4 wherein forming a greenware ferrule comprises forming said ferrule having a shank portion extending from an end thereof.

6. The method of manufacturing an archery broadhead of claim 4 wherein forming a greenware ferrule comprises forming said ferrule having a tip portion extending from an end thereof.

7. [The] *A* method of manufacturing an archery broadhead [of claim 4] *comprising:*

*powder injection molding at least one broadhead component selected from the group consisting of a ferrule and a blade;*

*forming a greenware ferrule from a powdered composition;*

*sintering said greenware ferrule at an elevated temperature to form a sintered ferrule; and*

*connecting said blade to said sintered ferrule,* wherein forming a greenware ferrule comprises forming a ferrule having a boss formed thereon, said boss being received in an aperture formed in said blade to pivotally couple said blade to said ferrule.

8. The method of manufacturing an archery broadhead of claim 4 wherein forming a greenware ferrule comprises forming a ferrule having a slot formed therein and said blade is received within said slot to releasably secure said blade to said ferrule.

9. The method of manufacturing an archery broadhead of claim 1 further comprising:

forming a greenware blade from a powdered composition;

sintering said greenware blade at an elevated temperature to form a sintered blade; and connecting said sintered blade to said ferrule with [said] *a* retainer.

10. The method of manufacturing an archery broadhead of claim 9 wherein said ferrule is provided with a longitudinal slot and said blade is received within said slot to releasably secure said blade to said ferrule.

11. [The] *A* method of manufacturing an archery broadhead [of claim 10] *comprising:*

*powder injection molding at least one broadhead component selected from the group consisting of a ferrule and a blade;*

*forming a greenware blade from a powdered composition;*

*sintering said greenware blade at an elevated temperature to form a sintered blade; and*

*connecting said sintered blade to said ferrule,*

*wherein said ferrule is provided with a longitudinal slot and said blade is received within said slot to releasably secure said blade to said ferrule,* wherein forming a greenware blade comprises forming said greenware blade having a bead along an edge thereof, said bead received within said slot when said sintered blade is releasably secured to said ferrule.

12. The method of manufacturing an archery broadhead of claim 8 further comprising:

forming a plurality of greenware blade from said powdered composition;

sintering said plurality of greenware blades at an elevated temperature to form a plurality of sintered blades; and connecting said plurality of sintered blades to said ferrule with [said] *a* retainer.

* * * * *